United States Patent [19]
Landes

[11] Patent Number: 6,060,981
[45] Date of Patent: May 9, 2000

[54] VEHICLE SECURITY SYSTEM FOR UNATTENDED IDLE OPERATIONS

[75] Inventor: James W. Landes, East Peoria, Ill.

[73] Assignee: Caterpillar Inc., Peoria, Ill.

[21] Appl. No.: 09/298,740

[22] Filed: Apr. 23, 1999

[51] Int. Cl.[7] ................................................. B60R 25/10
[52] U.S. Cl. ........................ 340/426; 180/287; 307/10.2; 307/10.4
[58] Field of Search ........................... 340/426; 180/287; 307/10.1, 10.2, 10.3, 10.4, 10.6

[56] References Cited

U.S. PATENT DOCUMENTS

| | | | |
|---|---|---|---|
| 3,544,804 | 12/1970 | Gaumer et al. | 307/10 |
| 3,718,202 | 2/1973 | Brock | 180/114 |
| 3,788,422 | 1/1974 | Bowler | 180/114 |
| 3,947,693 | 3/1976 | Eskenas | 307/10 |
| 4,084,657 | 4/1978 | Bradley et al. | 180/114 |
| 4,090,089 | 5/1978 | Morello et al. | 307/40 |
| 4,180,043 | 12/1979 | Kawamura | 123/146.5 B |
| 4,438,426 | 3/1984 | Adkins | 340/64 |
| 4,447,850 | 5/1984 | Asher | 361/172 |
| 4,673,914 | 6/1987 | Lee | 340/64 |
| 4,682,062 | 7/1987 | Weinberger | 307/10 AT |
| 4,786,900 | 11/1988 | Karasawa et al. | 340/825.31 |
| 4,852,680 | 8/1989 | Brown et al. | 180/287 |
| 4,884,207 | 11/1989 | Asada et al. | 364/431.03 |
| 4,932,494 | 6/1990 | Chandler | 180/287 |
| 5,006,843 | 4/1991 | Hauer | 340/825.31 |
| 5,023,591 | 6/1991 | Edwards | 340/426 |
| 5,335,748 | 8/1994 | Wilson | 180/270 |
| 5,396,216 | 3/1995 | Morgan | 340/426 |
| 5,481,253 | 1/1996 | Phelan et al. | 340/825.31 |
| 5,570,756 | 11/1996 | Hatcher | 180/287 |
| 5,635,901 | 6/1997 | Weinblatt | 340/426 |
| 5,821,631 | 10/1998 | Loraas et al. | 307/10.4 |
| 5,828,297 | 10/1998 | Banks et al. | 340/426 |

*Primary Examiner*—Edward Lefkowitz

[57] ABSTRACT

A vehicle theft deterrent system for controlling the operation of a vehicle engine when the engine is in an unattended idle mode of operation wherein a vehicle ground speed sensor, an engine speed sensor, an operator input device actuatable to enter a security code, a power takeoff (PTO) switch operable to provide power from the engine to a remote location, a throttle position indicator sensor, cruise control switches, and an ignition key switch are all coupled to an electronic controller in a particular manner such that the proper combination of a valid security code and certain signal inputs from the various system components will enable and disable a secure idle mode of operation, and will limit vehicle operation if unauthorized use is detected while the system is enabled. The present system allows the electronic controller to determine whether the vehicle is moving and/or performing some type of work function prior to any enablement of the system and, once enabled, allows an operator to elevate the engine speed above normal idle limits to run certain parasitic loads prior to leaving the vehicle unattended without triggering the theft deterrent features of the present system.

27 Claims, 7 Drawing Sheets

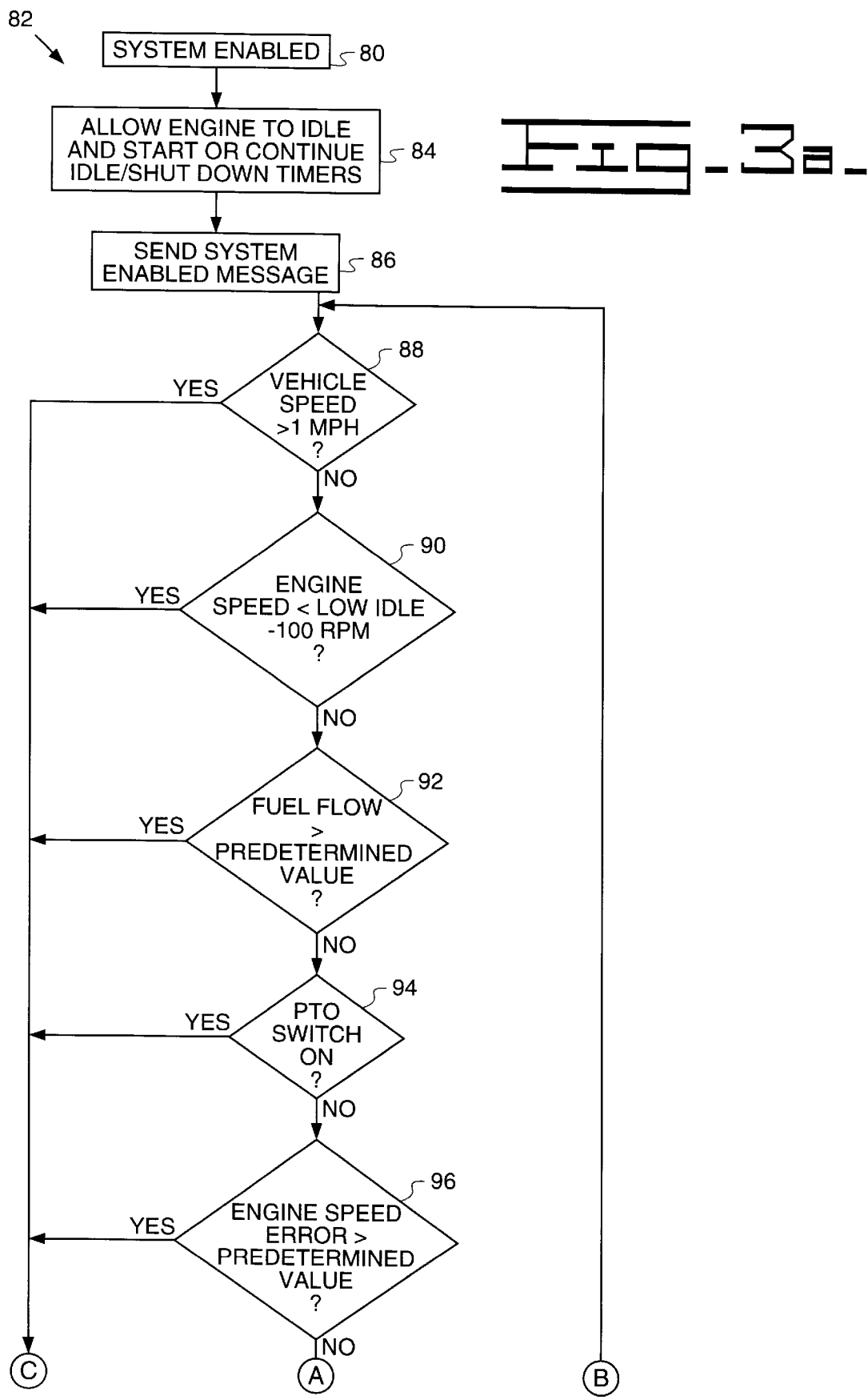

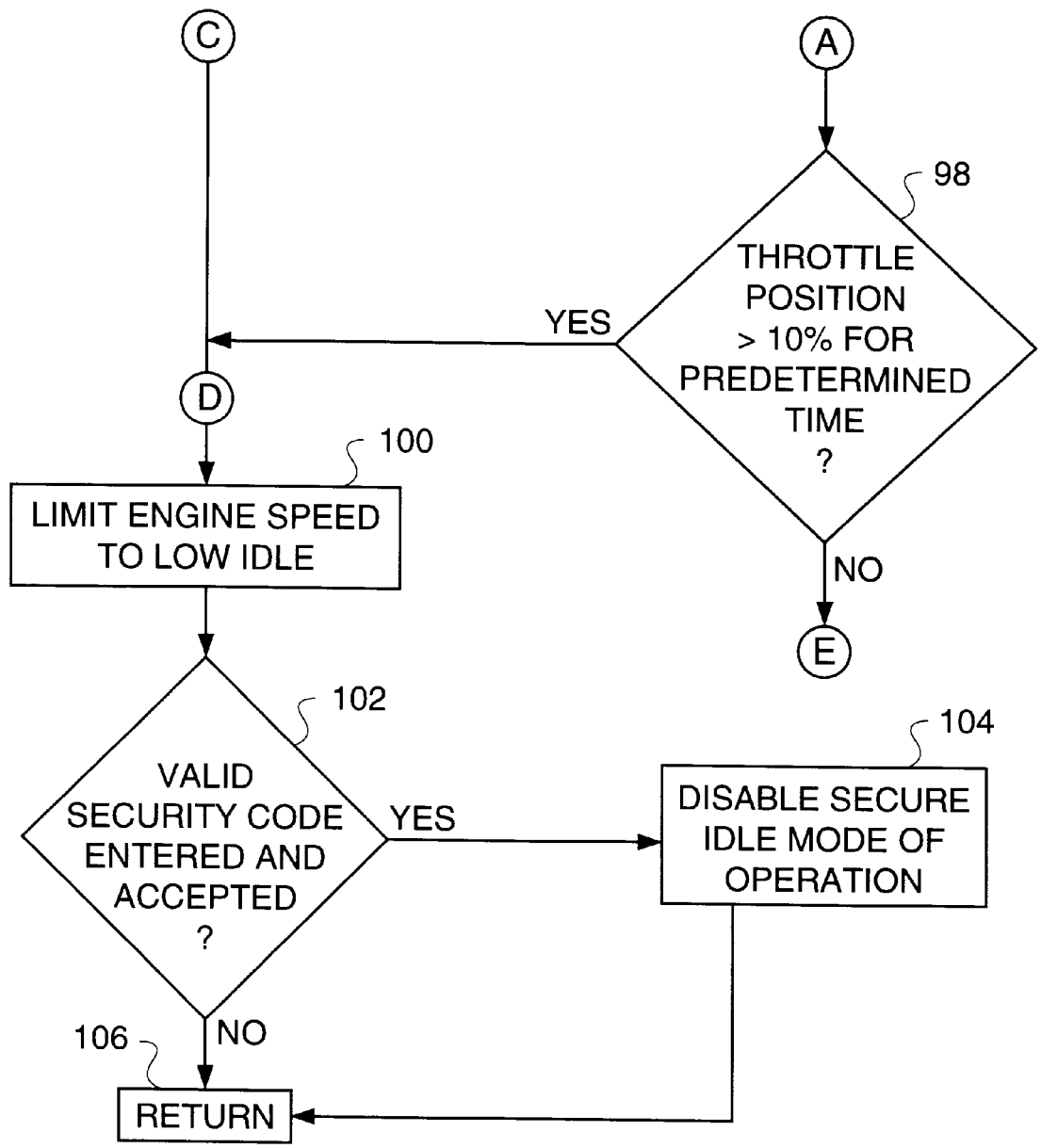
Fig_3b_

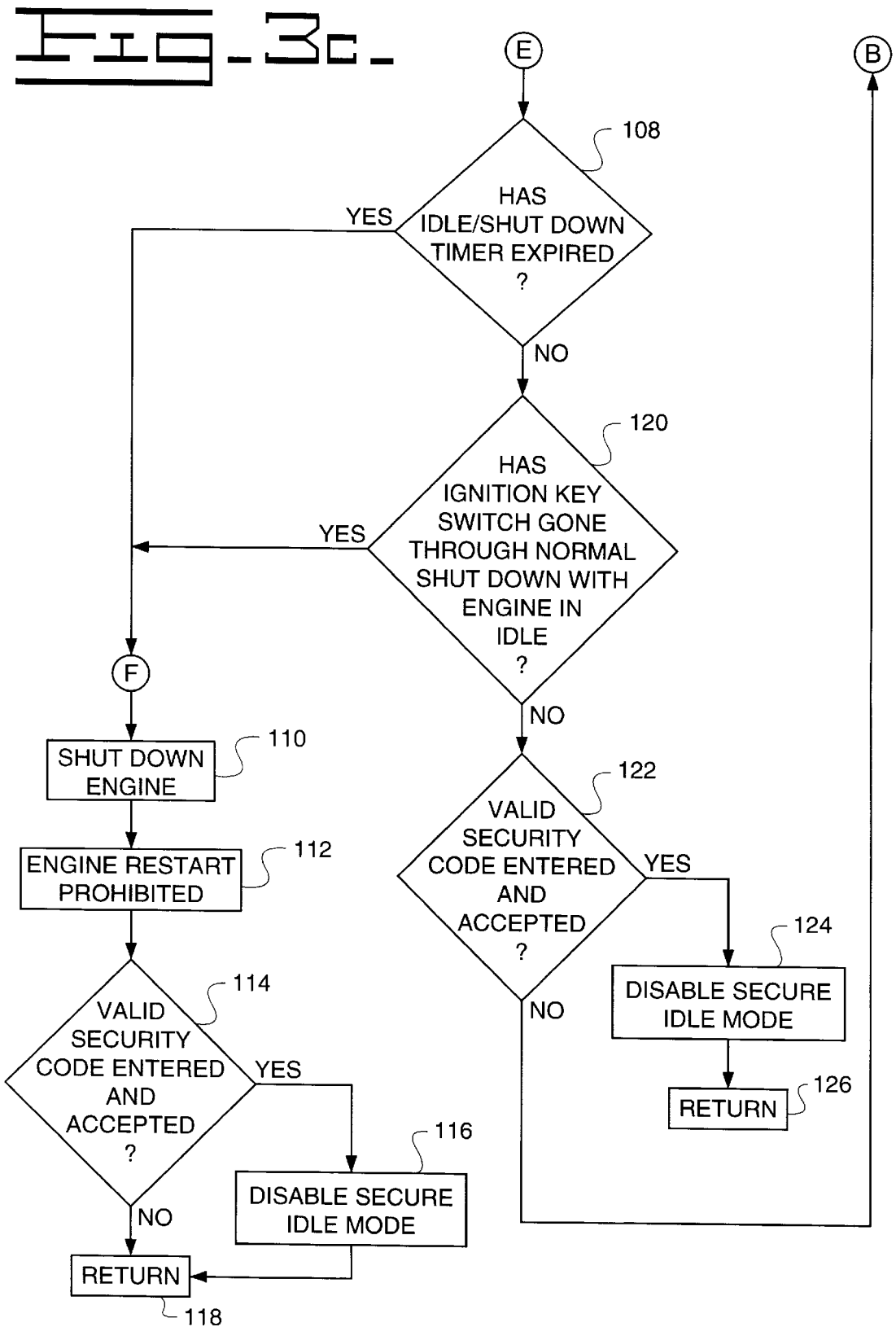

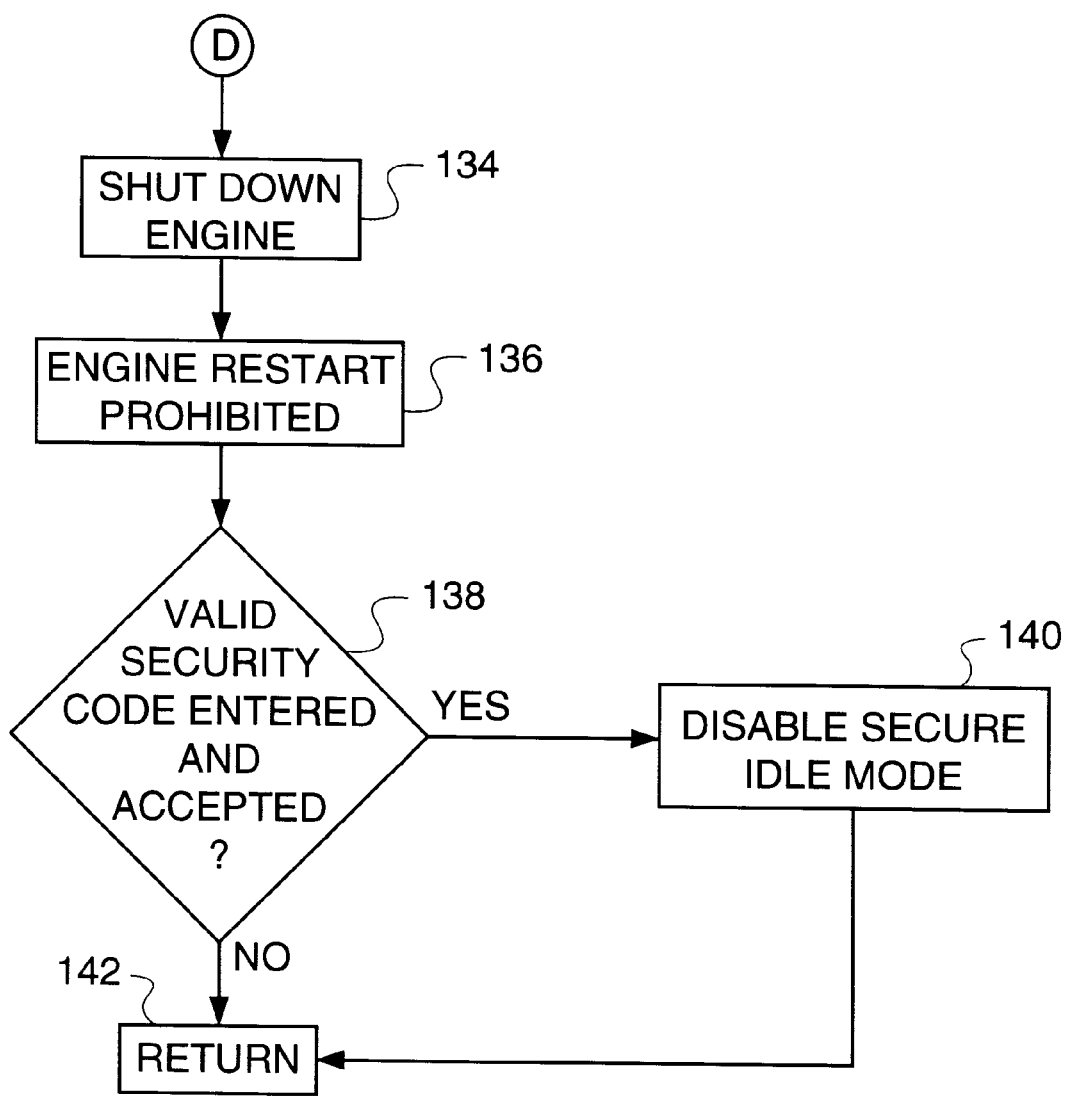

VEHICLE SECURITY SYSTEM FOR UNATTENDED IDLE OPERATIONS

TECHNICAL FIELD

This invention relates generally to vehicle theft deterrent systems and, more particularly, to a theft deterrent system for use in an idle mode of operation wherein the system evaluates a plurality of vehicle/engine parameters in order to ensure that the vehicle is motionless and is not performing some type of work task prior to enablement of the system. Once the present system is enabled, an elevated engine operation above normal idle limits is achievable to run certain parasitic loads without triggering the theft deterrent features of the system.

BACKGROUND ART

For a multitude of different reasons, it is often times desirable to allow vehicle or work machines such as a wide variety of different types of earthmoving equipment to idle unattended. For example, in the case of work machines equipped with diesel engines, or other engines of a type which may be difficult to start, it is often times advantageous to keep these types of vehicles running at all times, even when such vehicles are left unattended. Also, earthmoving equipment typically operate in work environments which give rise to situations and/or conditions wherein the vehicle/work machine must be left unattended in an idle condition.

A wide variety of different types of theft deterrent systems are presently in use today on a wide variety of different types of vehicles in order to deter unauthorized use and/or theft of the vehicle. These theft deterrent systems are typically engaged through a wide variety of different activation means including activating such systems both when the particular vehicle goes through a normal engine shutdown procedure as well as while the vehicle engine remains running. The known theft deterrent systems typically include an alarm which emits a warning signal when unauthorized vehicle access is obtained, or such systems may include mechanical and/or electrical systems that inhibit the normal operation of the vehicle in some fashion.

In the case of the known theft deterrent systems which are engageable while the vehicle engine is still running, enablement of such systems are often times solely dependent upon monitoring only engine speed and/or vehicle speed. As a result, certain sensor failures and/or other engine operating conditions may allow such systems to be enabled under unsafe or less than desirable conditions. For example, machine operators have been known to unplug the vehicle speed sensor in order to bypass certain operational characteristics of the particular work machine involved. If this was to occur, or if the vehicle speed sensor was to fail, situations could arise wherein a secure idle mode of operation could be engaged while the work machine is actually moving or performing some type of work function. If such a theft deterrent system was to thereafter limit or alter normal vehicle operation, or even shutdown the engine, while the vehicle was still in motion, or while a particular work task or function was still being performed, an unsafe situation may occur.

Similarly, if the engine speed sensor was to fail, or was otherwise bypassed for some particular reason, a secure idle mode of operation could be enabled while the engine was actually performing work. Here again, this could give rise to an unsafe condition endangering the safety of both workers and equipment in the vicinity of the particular vehicle or work machine.

It is therefore desirable to provide an enhanced theft deterrent system for operating a vehicle in an unattended idle situation wherein a plurality of different operational state parameters including engine load parameters are monitored and evaluated prior to any enablement of such system, and wherein such system cannot be enabled if the engine is performing work, or is about to perform work, even if the vehicle speed and/or engine speed are within proper limits for enablement.

In addition, when a particular vehicle is being operated in the idle mode, it is often times desirable to run various parasitic loads while the vehicle is left unattended. Such parasitic loads may include operating heating and cooling fans, air conditioning, air compressors, and other such devices. When such parasitic devices are employed, engine RPM above low idle may be required. In some cases, such elevated engine speeds may exceed 2000 RPM. With the known prior art systems, such elevated engine speeds will trigger the theft deterrent features of such prior art systems, such as either shutting down the engine or limiting the operation of such engine to the idle mode. As a result, operation of certain parasitic loads when in a secure idle mode of operation is not possible.

Still further, in certain work environments, it may also be desirable to shutdown the vehicle engine after the vehicle has been left in an unattended idle condition for a predetermined period of time. Here again, the known theft deterrent systems operable to effect a secure idle mode of operation will not automatically shutdown the vehicle engine separate and apart from sensing and determining that a particular operational state parameter has not been maintained. While the known prior art systems are operable to provide at least some measure of vehicle theft protection in a secure idle mode of operation, such systems do not address the aforementioned problems and many such systems may be bypassed and/or defeated.

It is therefore also desirable to provide an enhanced theft deterrent system operable in a secure idle mode of operation wherein an elevated engine operation is achievable to run certain parasitic loads without triggering the theft deterrent features of the system. Under certain circumstances, it may also be desirable to have certain vehicle/engine events trigger a normal shutdown of the vehicle engine and enablement of other theft deterrent features. Still further, it is also desirable to monitor a wide variety of different vehicle/engine functions so as to defeat any attempt to bypass the system.

Accordingly, the present invention is directed to overcoming one or more of the problems as set forth above.

DISCLOSURE OF THE INVENTION

The present invention teaches the construction and operation of an operator selectable unattended idle theft deterrent system wherein an operator personal identification security code input device and certain vehicle/engine sensors, switches and other operational state indicators are all coupled to an electronic controller in a particular manner such that the proper combination of a valid security code and certain vehicle/engine performance signals inputted to the electronic controller will enable and disable the secure idle mode of operation, and will limit vehicle operation if unauthorized use is detected while such theft deterrent system is enabled.

In one aspect of the present invention, the electronic controller evaluates signals indicative of engine speed, vehicle ground speed, the position of the power takeoff (PTO) switch, fuel flow, an engine speed error, and entry of a valid security code before determining whether to enable the present system. This particular array of vehicle/engine parameters functions as a security interlock feature and prevents the secure idle mode of operation from being enabled while the vehicle is performing a work function, or while a load or other activities indicative of vehicle movement and/or operation are occurring. If the electronic controller sees a load or other activities indicative of vehicle/engine operation outside of the very specific parameters discussed hereinafter, the controller will not allow the present unattended idle theft deterrent system to be enabled.

In this regard, monitoring the engine fuel flow and the position of the PTO switch is one indication that the vehicle/engine is performing some type of work task even if the vehicle ground speed is zero and the engine speed is within proper idle parameters. If the present system were to be enabled while the vehicle was performing a particular work task, an unsafe condition may arise and the electronic controller would immediately output appropriate signals to either shutdown the vehicle engine, or to limit the engine speed to a predetermined low idle range. If this should occur, equipment or materials may be dropped, unexpected boom movement may occur, or some other unplanned and unexpected event may take place. This potentially unsafe situation is avoided by allowing the electronic controller to monitor the commanded fuel flow and the position of the PTO switch so as to determine whether a load function or work task is being performed, even if the vehicle ground speed is zero and the engine speed is within proper idle parameters.

Monitoring the engine governor speed error during enablement of the present system also affords an additional measure of safety. Engine speed governors typically function to compare a desired engine speed, which maybe requested through positioning of the throttle, a cruise control set speed, map values or other known methods, with actual engine speed to produce a difference which is known as the engine speed error. The electronic controller outputs fuel flow commands and other appropriate signals to drive the actual engine speed toward the desired or requested engine speed. The software associated with the present system can be programmed such that if the engine speed error exceeds a predetermined value, such as 100 RPM, such engine speed error will be indicative of the operator requesting a sufficient increase in engine speed to either perform a work function, or to drive the vehicle. Here again, monitoring of this parameter will prevent the present system from being enabled while the vehicle is performing a work task, or while the vehicle is in motion even though the vehicle speed sensor may be indicating zero. The same is likewise true with respect to monitoring the commanded fuel flow to the engine, since a fuel flow above a predetermined value will likewise indicate an elevated engine speed which again will be indicative of the vehicle moving or performing some type of work task.

All of the above-identified vehicle/engine indicators and parameters must be met before the electronic controller will enable the present secure idle mode of operation. If any one indicator or parameter is outside of the programmed limits, the system will not be enabled. This, therefore, prevents the system from being enabled while the vehicle is performing a work task, or while the vehicle is in motion with an inoperative vehicle speed sensor.

In another aspect of the present invention, once the present system is enabled, additional vehicle/engine parameters are monitored to ensure that unauthorized use of the vehicle does not occur in the secure idle mode of operation. In this regard, when enabled, the present system will allow the vehicle engine to continue to idle at some predetermined RPM, or within some predetermined idle range, until vehicle movement is detected, or until some other vehicle/engine monitoring event has occurred which is indicative of vehicle motion or some type of work task being performed. If the electronic controller sees a load or other activities indicative of vehicle operation occurring, the controller will output appropriate signals to the engine speed governor to either shut down the engine, or to limit the engine speed to a predetermined low idle range.

In another aspect of the present invention, once enabled, the present system will allow a vehicle operator to increase engine speed to an elevated speed above the idle parameters in order to allow the operator to run certain parasitic loads without triggering the theft deterrent features of the present system. This is accomplished through the use of the cruise control switches wherein such switches are programmed such that: (1) the increase in the engine speed command caused by depressing a switch, the resume switch for example, will not exceed the engine speed error limit monitored by the present system; and (2) such that the ramp up acceleration resulting from holding such a switch depressed will not cause the engine speed error to exceed the engine speed error limit or a predetermined fuel flow. This programming is accomplished through the electronic controller and will enable the vehicle operator to slowly bump up the engine RPM to an elevated engine RPM necessary for running parasitic loads such as heating and cooling fans, air conditioning, and so forth. Any other indication of engine acceleration by either movement of the throttle beyond certain predetermined limits, or by exceeding a predetermined engine speed error value or a predetermined fuel flow value will trigger the theft deterrent features of the present system and will either shutdown the vehicle engine, or limit engine speed to a predetermined low idle range.

Still further, in another aspect of the present invention, when enabled, the present system also monitors an idle/shutdown timer as well as the position of the ignition key. If the idle/shutdown timer associated with the present system expires while the system is enabled, the engine will automatically be shutdown. If this occurs, the secure idle mode of operation will not allow the engine to be restarted until a valid security code is entered and recognized by the electronic controller. Alternatively, if the engine is automatically shutdown via the present system, the electronic controller could also be programmed to automatically enable another theft deterrent system available on the particular vehicle when the vehicle engine is not running.

In a similar fashion, if the ignition key is turned to the "off" position with the vehicle engine in the idle mode, the engine will go through a normal shutdown procedure and will be shutdown. If this occurs, the secure idle mode of operation will again prevent the engine from being restarted until a valid security code is entered and recognized by the electronic controller. Here again, the electronic controller could likewise be programmed to automatically enable another theft deterrent system when the vehicle engine is shutdown.

As will be hereinafter further discussed, the specific parameters and predetermined values and ranges selected for monitoring and evaluation by the electronic controller when the present system is enabled provides a theft deterrent system which is less likely to be defeated by disconnecting certain sensors and/or by bypassing certain features or systems associated with the particular vehicle. In this regard, it is recognized and anticipated that the engine monitoring events which trigger the detection of unauthorized use can vary depending upon the particular vehicle as well as the particular applications involved. Various embodiments of the present invention may include any combination of these engine monitoring events or parameters for selectively altering or limiting normal vehicle operation. Still further, as indicated above, it is also recognized and anticipated that the present system may be utilized separate and apart from any other theft deterrent system associated with any particular vehicle, or the present system may be utilized in conjunction with an existing theft deterrent system which is either manually, or automatically enabled when the vehicle engine is shutdown.

The present theft deterrent system can be incorporated into any vehicle or work machine wherein a secure mode of operation for allowing the vehicle to idle unattended is desired.

BRIEF DESCRIPTION OF THE DRAWINGS

For a better understanding of the present invention, reference may be made to the accompanying drawings in which;

FIGS. 3A, 3B, 3C are flow charts of operating steps illustrating one embodiment for configuring the electronic controller of FIG. 1 for a secure idle mode of operation in accordance with the teachings of the present invention; and FIGS. 3D and 4 are flow charts of operating steps illustrating still other embodiments for configuring the electronic controller of FIG. 1 for a secure idle mode of operation.

BEST MODE FOR CARRYING OUT THE INVENTION

Figure 1:
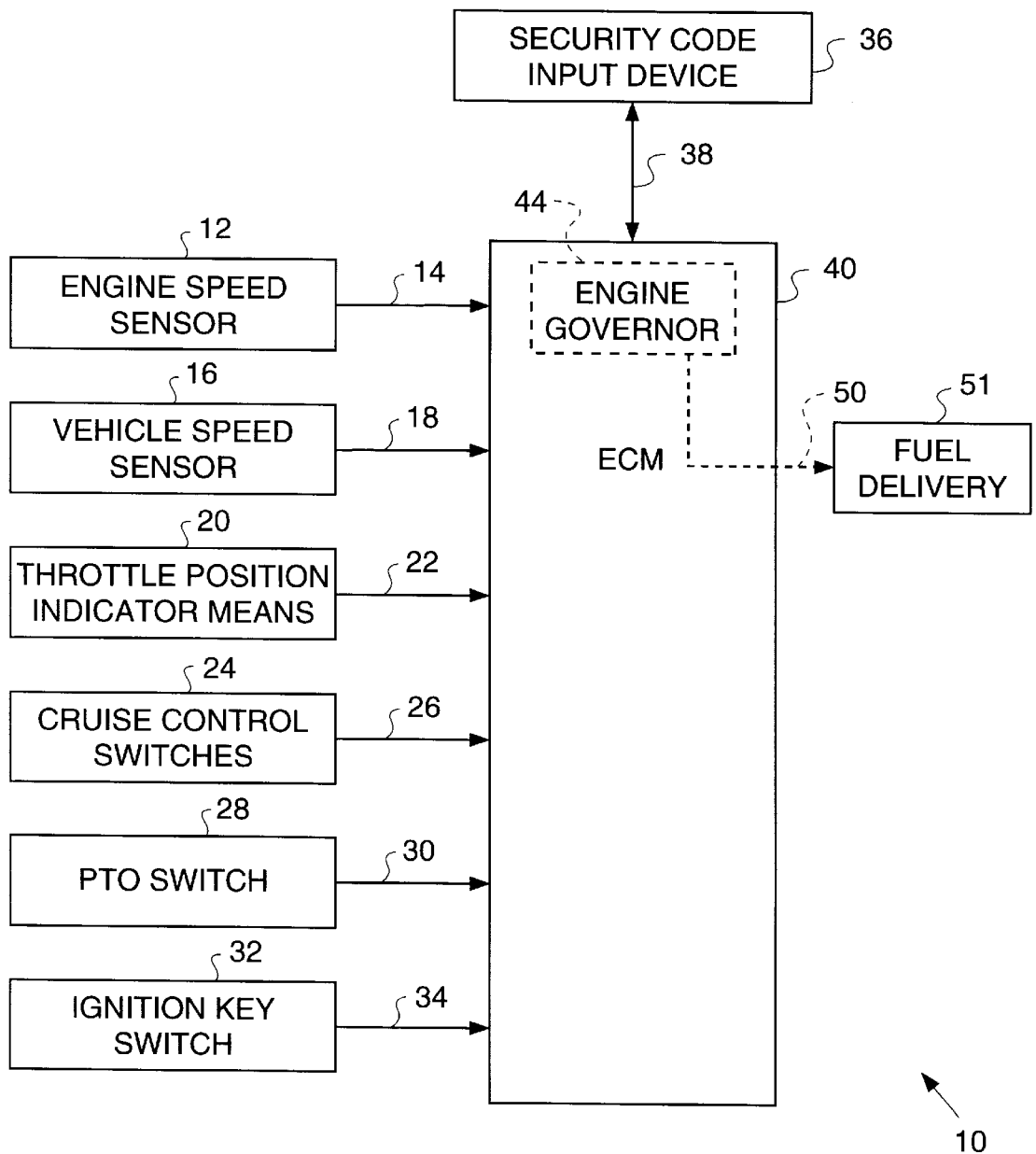
FIG. 1 is a schematic diagram of one embodiment of a vehicle theft deterrent system constructed in accordance with the teachings of the present invention.

Referring to FIG. 1, numeral 10 in FIG. 1 represents one embodiment of the theft deterrent system of the present invention, the present system 10 being specifically operable to achieve a secure idle mode of operation when the vehicle is left unattended. The theft deterrent system 10 includes an engine speed sensor 12, a vehicle speed sensor 16, throttle position indicating means 20, cruise control switches 24, a power takeoff (PTO) switch 28, an ignition key switch 32, and a security code input device 36, all of which switches, sensors and other indicator means provide signal inputs to an electronic control module (ECM) 40. Based upon the signal inputs from sensors 12 and 16, the throttle position indicator means 20, switches 24, 28 and 32, the security code input device 36, as well as a calculated fuel flow 42 command signal 50 and the engine speed error 46, which is calculated by an engine governor 44, the ECM will control fuel flow to the engine consistent with the principles of the software illustrated in FIGS. 2–4. Although the embodiment shown in FIG. 1 shows the use of a single engine governor, it will be apparent to those skilled in the art that more than one such governor could be included in the ECM without deviating from the scope of the present invention. The engine speed governor 44 will control the engine speed in a conventional manner; and in a preferred embodiment, the governor 44 may be a PID controller implemented in the ECM 40 in software. In alternative embodiments, however, a mechanical device separate and apart from the ECM 40 and other components comprising the present system, or the governor 44 may be a separate computer or electronic control module associated with the vehicle engine. Regardless of the construction and operation of the engine speed governor 44, such governor will control the engine speed, including shutdown of the engine, based upon a command fuel flow signal 50 from ECM 40.

Electronic controllers or modules such as ECM 40 are commonly used in association with work machines and other vehicles for controlling and accomplishing various functions and tasks including controlling engine operation associated with a particular vehicle or work machine. In this regard, ECM 40 will typically include processing means, such as a microcontroller or microprocessor, associated electronic circuitry such as input/output circuitry, analog circuits and software instructions, as well as associated memory. The software instructions included in ECM 40 can therefore cause the ECM 40 to sense and recognize appropriate signals from input devices 12, 16, 20, 24, 28, 32, 36, 42 and 46 indicative of certain conditions or parameters as will be hereinafter explained, and thereafter provide appropriate output signals to accomplish certain tasks, such as controlling engine speed operation through the engine speed governor 44 and the commanded fuel flow signal 50.

An engine speed sensor 12 is coupled to ECM 40 via conductive path 14 for constantly providing an engine speed feedback signal to ECM 40 during the operation of the particular work machine. The engine speed sensor 12 constantly senses and monitors the engine speed and provides such information to ECM 40 for the reasons hereinafter explained. Engine speed sensors are well known in the art and could take on a wide variety of different configurations and applications such as a magnetic speed pickup sensor associated with the camshaft and/or crankshaft of the vehicle engine. Other suitable engine speed measuring devices or sensors such as Hall effect sensors and tachometers are likewise well known in the art and could be utilized to determine engine speed.

A vehicle speed sensor 16 is likewise coupled to ECM 40 via conductive path 18 for constantly delivering vehicle speed or ground speed indicative signals to ECM 40 during the operation of the particular work machine. The vehicle speed or ground speed sensor 16 constantly senses and monitors the particular ground speed of the work machine and provides such information to ECM 40 for the reasons hereinafter explained. Here again, vehicle speed sensors are likewise well known in the art and could take on a wide variety of different forms. For example, the vehicle speed sensor could be a radar unit properly positioned on the work machine, the use of which to measure ground speed is advantageous in that it gives a true indication of ground speed or vehicle speed that is independent of other parameters such as wheel slippage. A magnetic speed pickup sensor associated with the transmission could also be utilized to deliver ground speed signals to ECM 40. Other sensors are likewise well known in the art and could likewise be utilized to determine the ground speed of the particular work machine. In this regard, any known vehicle motion sensor operable to provide a signal indicative of vehicle motion such as magnetic speed pickup sensors, Hall effect sensors and the like may also be utilized.

A throttle position indicator means 20 is also coupled to ECM 40 via conductive path 22 for constantly delivering a signal to ECM 40 indicative of the throttle position or throttle setting being requested by the machine operator. The throttle position indicator means 20 may likewise take on a wide variety of different configurations well known in the art and may include a sensor attached to the throttle mechanism itself for measuring throttle displacement from a particular reference point. Other sensors are likewise well known and may include known components for providing an analog or digital signal to ECM 40 indicative of either the throttle position at any particular point in time, or the operator demand for acceleration.

Cruise control switches 24 enable an operator to easily control and set engine speed based upon the particular work task being accomplished. The cruise control switches 24 can be programmed through ECM 40 to allow the operator to easily set and hold the engine RPM at a particular level based upon a particular work task, and such switches will allow the operator to accelerate or decelerate the engine RPM. The incremental engine speed bump up factor as well as the engine acceleration ramp up rate can be programmed as will be hereinafter explained so as not to exceed certain parameters used for controlling the secure idle mode of operation of an embodiment the present invention. Cruise control switches 24 are coupled to ECM 40 via conductive path 26 for constantly inputting to ECM 40 the position of the switches 24.

The present system 10 also includes a power take off (PTO) switch 28 which is typically an on/off switch which allows the operator to transfer engine power to a PTO shaft or to some other mechanism or remote location in order to accomplish a particular work task. PTO switch 28 is likewise coupled to ECM 40 via conductive path 30 and, as such, a signal indicative of such switch position will be continuously inputted to ECM 40. If PTO switch 28 is in the "on" position, such position is indicative of the fact that the particular work machine is under load and is performing some type of work task, or that the work machine is about to perform some type of work task.

An ignition key switch 32 operable to start and shutdown the vehicle engine is also coupled to ECM 40 via conductive path 34. Various types of ignition key switches are well known in the art and typically include a plurality of different switch positions including an "on" position, an "off" position, and a "start" position. As such, ECM 40 will monitor and sense the position of the ignition key switch 32 and, based in part on the signal inputted via conductive path 34, ECM 40 will determine if the engine has gone through a normal shutdown procedure.

As is well known in the art, ECM 40 is also operable through associated programming to constantly produce a desired fuel flow command based in part on the engine speed error calculation of the engine governor 44. Although the fuel flow command signal 50 to the present system is illustrated in FIG. 1 as being a value calculated by the ECM 40, it is recognized and anticipated that this fuel flow rate can be obtained or otherwise inputted to ECM 40 via a wide variety of different ways well known in the art including using a wide variety of different sensors or other indicator means located within the fuel system for determining the fuel flow to the engine and conveying such information back to ECM 40. In this regard, any known fuel flow indicator or sensor means operable to provide a signal to ECM 40 indicative of the fuel flow to the engine may be utilized.

In similar fashion, ECM 40 likewise constantly senses and compares the desired engine speed as requested by the operator, cruise control, PTO control, or other engine feature, to the actual engine speed and produces an engine speed error, which is then used to calculate a commanded fuel flow rate signal that is an input to the fuel delivery system 52. This difference between the desired engine speed and the actual engine speed is often times referred to as engine speed error and various ranges and limitations regarding this speed error can be programmed into the engine speed governor 44, or ECM 40, or other means in communication therewith. A signal indicative of the governor speed error can be inputted to ECM 40 in a variety of different ways known in the art. The present invention is therefore intended to cover all possible engine governor/electronic controller configurations.

The present system 10 further includes a security code input device 36 which is likewise coupled to ECM 40 via conductive path 38. The security code input device 36 is responsive to the entry of a valid personal identification security code by the operator so as to allow ECM 40 to either enable or disable the present theft deterrent system based upon acceptance of the security code and the fulfillment of other operating criteria as will be hereinafter explained. Security code input device 36 may include a display monitor, a key pad, or other operator selectable means for inputting the security code. A wide variety of different types of security code interface modules including a wide variety of different types of internal hardware are well known in the art and can be utilized to achieve this task.

Figure 2:
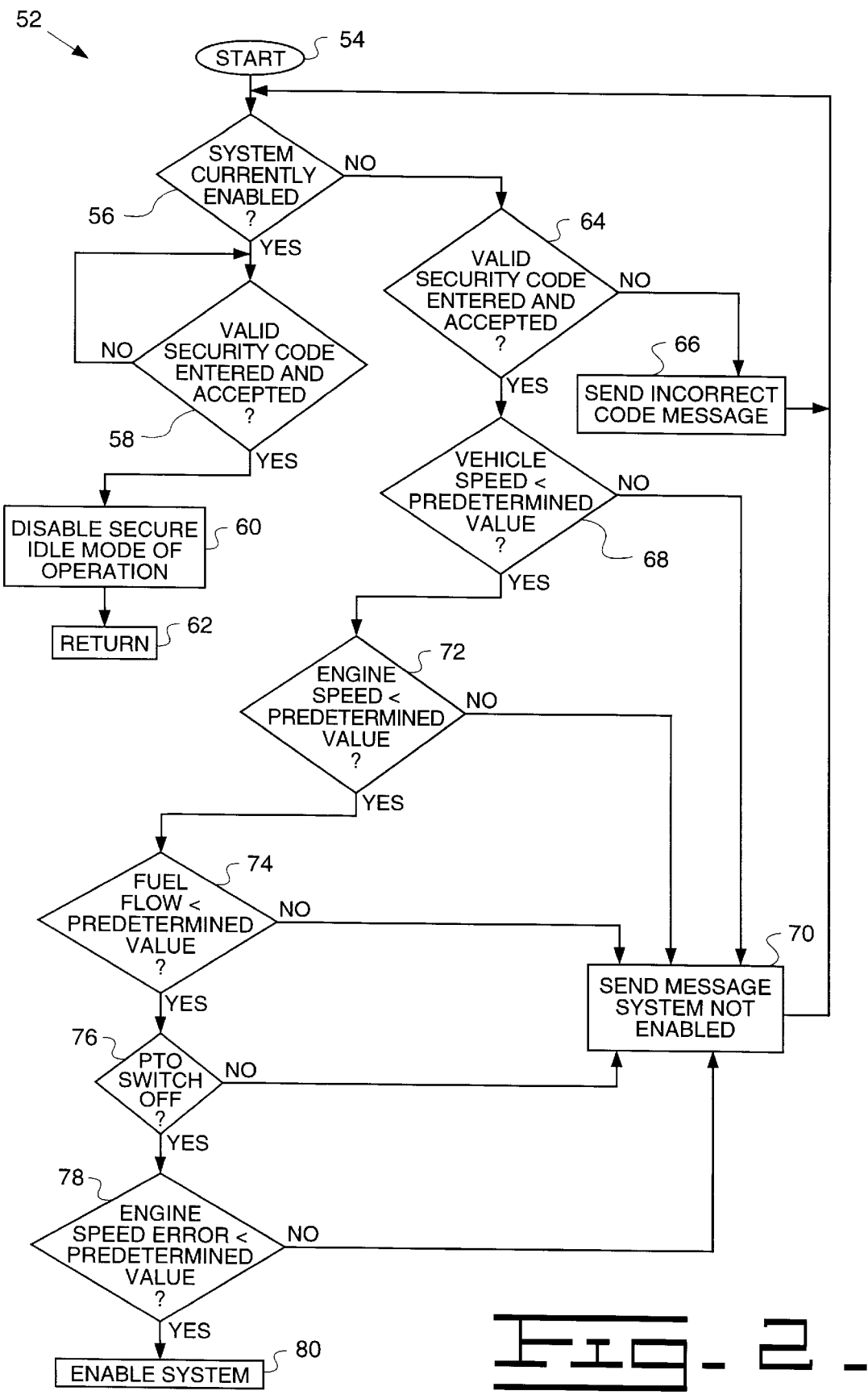
FIG. 2 is a flow chart of operating steps illustrating one embodiment for configuring the electronic controller of FIG. 1 for enabling the present theft deterrent system for an unattended idle mode of operation in accordance with the teachings of the present invention.

In operation, ECM 40 may be directed by the vehicle operator to enable the present theft deterrent system for an unattended idle mode of operation. Before ECM 40 will enable the secure idle mode of the present invention, fulfillment of a plurality of operating parameters must preferably be achieved. These parameters are set forth in the flow chart of operating steps illustrated in FIG. 2 for enabling the present system. Referring now to FIG. 2, a flow chart 52 of the software instructions implemented in software by the ECM 40 are shown. The specific software instructions implementing a preferred embodiment of the theft deterrent system 10 of the present invention can be readily and easily written by those skilled in the art from the detailed flowcharts shown in the figures. Control loop 52 begins at step 54 and at step 56, when the ECM 40 determines whether the present theft deterrent system 10 is already enabled. If the secure idle mode of system 10 is already operational, control loop 52 will continue execution at step 58 wherein ECM 40 will monitor the security code input device 36 for entry of a valid security code. Step 58 continuously loops back onto itself until a valid security code is entered and received by ECM 40, at which point ECM 40 will disable the secure idle mode of operation and normal vehicle/engine operation can be resumed. As will be hereinafter further explained, the only way an operator can disable the secure idle mode of operation of the present system 10, once it is enabled, is to again enter a valid security code through input device 36. Once the present secure idle mode is disabled, control loop 52 will end or will return to its calling routine at step 62.

Returning again to step 56, if the secure idle mode of operation of the present system 10 has not already been enabled, control loop 52 will continue at step 64 and will again look to see if a valid security code has been entered. Step 64 is substantially identical to step 58 and if ECM 40 does not recognize and accept the code entered through input device 36, ECM 40 will send an incorrect code message to the vehicle operator via some type of display means associated with input device 36, or some type of display means located elsewhere in the operator compartment, and step 66 will loop back to the start of control loop 52. If, on the other hand, ECM 40 recognizes and accepts the security code entered through input device 36 at step 64, control loop 52 will continue execution and proceed to step 68.

At step 68, ECM 40 monitors the vehicle speed sensor 16 and determines whether the vehicle ground speed is zero, substantially zero, or less than some other predetermined value such as less than 1 mile per hour. This operational state parameter is checked in order to ensure that the vehicle is motionless, or substantially motionless, before the present secure idle mode of operation is enabled. If the particular vehicle is, in fact, in motion for any reason, enabling the secure idle mode of operation and thereafter limiting engine speed may give rise to or cause an unsafe operating condition. If ECM 40 determines that the vehicle ground speed is not equal to zero or some other predetermined value, ECM 40 will output a signal at step 70 to the display means located in the operator compartment advising the operator that the secure idle mode of operation is not enabled and step 70 will loop back to the beginning of control loop 52.

If, on the other hand, at step 68, ECM 40 determines that the vehicle ground speed is equal to zero, or is less than some other predetermined value, control loop 52 will then advance to step 72 and ECM 40 will monitor the engine speed sensor 12 to determine if the engine speed is less than some predetermined value. This predetermined engine speed value should be selected so as to ensure that the engine is operating in its idle mode of operation, or in a range substantially close thereto. For example, this predetermined engine speed value may be selected as low idle RPM plus 100 RPM. As a result, if the engine speed is less than low idle plus 100 RPM, this will ensure that the engine is, in fact, operating in its idle mode and control loop 52 will advance to step 74. If, on the other hand, ECM 40 determines that the engine speed is greater than the selected predetermined value, ECM 40 will interpret this elevated engine speed as being an indication that the vehicle is in motion, or some type of work is being performed, and ECM 40 will again send a message to the operator, at step 70, advising that the secure idle mode of operation is not enabled.

At step 74, ECM 40 will compare the fuel flow command signal 50 that is issued to the vehicle engine to some predetermined value. This predetermined fuel flow rate value is selected so as not to exceed the fuel flow rates normally utilized by the vehicle to run certain parasitic loads such as air conditioning, heating and cooling fans, the air compressor and so forth, but such predetermined value will be less than the fuel flow rates normally utilized to perform various work functions. As a result, at step 74, ECM 40 is able to determine if the vehicle is under load and performing some type of work function. Here again, if the present secure idle mode of operation was to be enabled while the vehicle was in motion or performing some type of work function, an unsafe work condition may arise when the vehicle engine is suddenly restricted in accordance with the teachings of the present invention. This operational state parameter check will also obviate the situation where the vehicle speed sensor is inoperative for whatever reason in that if the vehicle is in motion at a speed greater than the predetermined value set forth in step 68, the fuel flow at step 74 will normally exceed the selected predetermined fuel flow value. As a result, if at step 74, the fuel flow rate is greater than the predetermined value, control loop 52 will advance to step 70 and the appropriate warning message will be conveyed to the vehicle operator. On the other hand, if the fuel flow rate at step 74 is less than the selected predetermined value, control loop 52 will advance to step 76.

At step 76, ECM 40 also monitors the position of the PTO switch 28 via conductive path 30 to again determine if the vehicle is performing some type of work function. If the PTO switch is in the "on" position, it is assumed that the vehicle is performing some type of work task, or the operator is anticipating the performance of some type of work function, and, as a result, ECM 40 will again convey the appropriate warning message to the vehicle operator via step 70 and the present secure idle mode of operation will not be enabled. If, on the other hand, the PTO switch is in the "off" position, ECM 40 will interpret this switch position as an indication that the vehicle is not currently performing a work task and control loop 52 will advance to step 78. Step 76 is another operational state performance check to ensure that the work machine is not engaged in a particular work function and step 76 serves as a backup safety feature to step 74.

At step 78, ECM 40 monitors the engine speed error computed by the engine governor 44, or some other means, and compares this difference between the desired engine speed and the actual engine speed to some predetermined value. The governor speed error predetermined value is typically selected so as to be in the range of between about 100 RPM to about 200 RPM so that small throttle movements may be accomplished in the idle mode without preventing the system from being enable. If ECM 40 determines that the speed error 46 is greater than the predetermined value, such a speed error is an indication that the vehicle operator is requesting a desired engine speed indicative of either performing a work task, or moving the vehicle, and, as such, ECM 40 will not enable the present system and will again convey a warning message to the vehicle operator at step 70. If, on the other hand, the engine speed error is less than the selected predetermined value, ECM 40 will interpret this reading as an indication that the desired engine speed being requested is not indicative of moving the vehicle, nor of performing some type of work function, and, as a result, will enable the present secure idle mode of operation at step 80.

If all of the operational state parameters set forth in steps 68, 72, 74, 76 and 78 are determined by ECM 40 to be within the established criteria, ECM 40 will enable the present secure idle mode of operation. When enabled, ECM 40 has verified that the vehicle is substantially at rest, that the vehicle is operating in its idle mode of operation, and that no work function or work task is being performed by the vehicle at that particular point in time. If ECM 40 sees a load or other activity indicative of vehicle operation occurring in contradiction to the parameters established at steps 68, 72, 74, 76 and 78, ECM 40 will not enable the secure idle mode of the present system.

Referring now to FIGS. 3A, 3B and 3C, once the secure idle mode is enabled, control loop 82 is executed in order to detect any unauthorized use of the vehicle. Here again, the operating steps as set forth in control loop 82 can be incorporated into the programming of the processing means of ECM 40 by techniques well known to those of ordinary skill in the art. Once the secure idle mode of operation is enabled at step 80, control loop 82 is initiated and, at step 84, ECM 40 will allow the vehicle engine to operate in a secure idle mode of operation and will start an idle/shutdown timer as will be hereinafter further explained. At step 86, ECM 40 will also send a message to the vehicle operator via display means located in the operator compartment that the system is enabled. Control loop 82 will then execute steps 88, 90, 92, 94, 96 and 98 in order to ensure that unauthorized use of the vehicle does not occur.

More particularly, at step 88, ECM 40 again monitors and senses the vehicle ground speed via sensor 16 and determines if the vehicle speed is now greater than some predetermined value such as 1 mile per hour. This predetermined value may be selected so as to be the same as or different from the value utilized at step 68. If the vehicle speed is greater than the predetermined value, ECM 40 recognizes that the vehicle is in motion, and, as a result, will automatically limit the desired engine speed command that is input to the engine speed governor 44 to some predetermined low idle RPM, such as 600 RPM, at step 100 (FIG. 3B). Conversely, if ECM 40 determines that the engine speed is less than the predetermined value established at step 88, ECM 40 recognizes that the vehicle is still motionless and control loop 82 will proceed to step 90.

At step 90, ECM 40 will monitor the engine speed via engine speed sensor 12 and will compare the current engine speed with some predetermined value. This second predetermined engine speed value is selected so as to be less than the first predetermined engine speed value associated with step 72 of control loop 52. For example, the predetermined value associated with step 90 may be low idle RPM minus 100 RPM. This second engine speed value is selected so as to avoid the situation where the engine may idle at a speed below the normal, or low idle, range. Accordingly, the predetermined engine speed value associated with step 90 is set at some engine speed value between low idle and an engine shutdown condition such that if ECM 40 determines that the engine speed is, in fact, less than this predetermined value, for example, low idle minus 100 RPM, ECM 40 will output a signal to the engine speed governor 44 to limit and keep the engine speed at the normal low idle RPM, or some other predetermined idle speed, at step 100 (FIG. 3B). If, on the other hand, ECM 40 determines that the engine speed at step 90 is greater than this predetermined value, such as low idle minus 100 RPM, control loop 82 will advance to step 92.

At step 92, ECM 40 again compares the commanded fuel flow signal 50 to a predetermined value. Step 92 is substantially identical to step 74 and the predetermined fuel flow value for step 92 may likewise be the same as or substantially similar to the predetermined fuel flow value established at step 74. Here again, this predetermined fuel flow value should be greater than the fuel flow value necessary for operating certain parasitic loads as previously explained. If ECM 40 determines at step 92 that the commanded fuel flow is greater than the predetermined value, ECM 40 will conclude that the vehicle is attempting to perform some type of work task, or that the operator is attempting to move the vehicle, and ECM 40 will again limit the engine speed at step 100 (FIG. 3B). If, on the other hand, ECM 40 determines that the commanded fuel flow is less than the predetermined value, control loop 82 will proceed to step 94.

Step 94 in control loop 82 is substantially identical to step 76 in control loop 52 and ECM 40 will again monitor the position of the PTO switch 28 via conductive path 30. Here again, as with step 76, if ECM 40 determines, at step 94, that the PTO switch has been moved to the "on" position, ECM 40 will again interpret this switch position to be an indication that the operator is attempting to perform some type of work function and will limit the engine speed to low idle, or to some other predetermined idle speed, at step 100 (FIG. 3B). Conversely, if ECM 40 determines that the PTO switch is still in the "off" position, control loop 82 will advance to step 96.

In a similar fashion, step 96 of control loop 82 is again substantially similar to step 78 of control loop 52 in that ECM 40 is again monitoring the engine speed error to determine if the operator is requesting a desired engine speed substantially greater than the actual engine speed which, in this case, is in the idle mode range. If ECM 40 determines that the engine speed error is, in fact, greater than the predetermined value previously discussed, ECM 40 will conclude that the operator is again attempting to either move the vehicle, or requesting an elevated engine speed to perform some type of work function, and, as a result, will limit such engine speed at step 100 (FIG. 3B). Conversely, if ECM 40 determines that the engine speed error is below the predetermined value, control loop 82 will advance to step 98 (FIG. 3B).

At step 98, ECM 40 constantly monitors the throttle position via conductive path 22 to again determine if the operator is attempting to move the vehicle or perform some type of work task by moving the throttle and requesting an elevated engine speed. If ECM 40 determines, at step 98, that the throttle position or setting has been advanced to a position greater than 10 percent for some predetermined time, such as for 500 milliseconds (ms), then ECM 40 will again limit the engine speed to low idle or some other predetermined idle RPM at step 100. If, on the other hand, ECM 40 determines that the throttle position is within limits at step 98, control loop 82 will advance to step 108 illustrated in FIG. 3C.

Operating steps 88, 90, 92, 94, 96 and 98 therefore provide enhanced operational state criteria for ensuring that unauthorized use or movement of a particular work machine or vehicle does not take place. In this regard, if, at step 100, ECM 40 limits the engine speed to a secure idle mode of operation as discussed above, the present system will stay enabled until a second occurrence of a valid security code is entered and accepted by ECM 40 at step 102. If ECM 40 recognizes a valid security code entered through input device 36 at step 102, then ECM 40 will disable the secure idle mode of operation at step 104 and control loop 82 will either end or will return to its calling routine at step 106. If, on the other hand, a valid security code is not entered or accepted at step 102, the vehicle will remain in the secure idle mode of operation and step 106 will be executed.

Returning now to FIG. 3C, if execution of steps 88, 90, 92, 94, 96 and 98 do not limit the vehicle engine speed at step 100, control loop 82 will then continue from step 98 to step 108 wherein ECM 40 will monitor the status of the idle/shutdown timer initiated at step 84. This timer can be set for any predetermined time interval based upon the particular vehicle application and/or the user's needs and, if the timer has expired, ECM 40 will automatically shutdown the vehicle engine at step 110. In one embodiment of control loop 82, if the engine is automatically shutdown at step 110, the secure idle mode of operation will prohibit engine restart at step 112 when ECM 40 is rebooted and awaken. This will ensure that if the vehicle remains unattended after engine shutdown, an unauthorized restart of the engine will not be possible.

Similar to steps 102, 104 and 106 illustrated in FIG. 3B, at step 114, if a valid security code is entered and recognized by ECM 40, ECM 40 will disable the secure idle mode of operation at step 116 and the vehicle engine can then be restarted. Control loop 82 will then end or return to its calling routine at step 118. If, on the other hand, a valid security code is not entered or recognized by ECM 40 at step 114, the secure idle mode of operation will continue to prohibit engine restart and step 118 will be executed.

If, on the other hand, the idle/shutdown timer has not expired at step 108, control loop 82 will advance to step 120 and look to see if the ignition key has gone through a normal shutdown procedure with the engine in the idle mode. If ECM 40 determines that the operator has shutdown the engine using normal engine shutdown procedures, the engine will be shutdown at step 110 and steps 112 through 118 will occur as previously explained. Here again, engine restart will be prohibited at step 112 until a second occurrence of a valid security code is entered and recognized by ECM 40 when it is awakened. If, on the other hand, the ignition key switch 32 has not gone through a normal shutdown procedure, control loop 120 will advance to step 122.

At step 122, ECM 40 will again monitor the security code input device 36 and if a second occurrence of a valid security code has been entered and recognized by ECM 40, ECM 40 will again disable the secure idle mode of operation at step 124 and control loop 82 will return to its calling routine at step 126. Conversely, if ECM 40 determines at step 122 that a valid security code has not be entered and recognized, control loop 82 will loop back to step 88 (FIG. 3A) and execution of control loop 82 will be repeated. It is recognized and anticipated that upon the second entry of a valid security code at any time after the secure idle mode is enabled, ECM 40 will disable the secure idle mode.

Figure 3D:
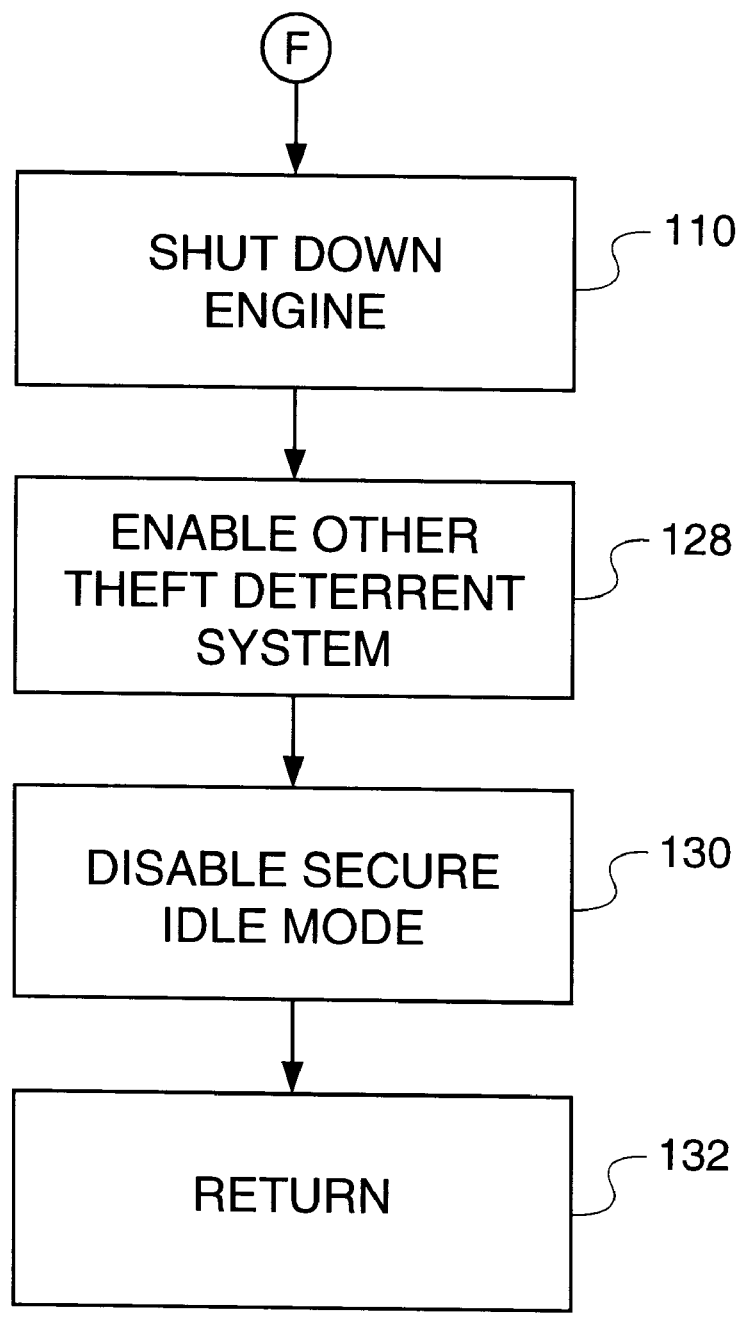

FIG. 3D represents still another alternative embodiment of control loop 82 wherein operating steps 128, 130 and 132 replace steps 112, 114, 116 and 118 illustrated in FIG. 3C. Once the vehicle engine is automatically shutdown at step 110, control loop 82 may advance directly to step 128 (FIG. 3D) and ECM 40 could be programmed to automatically enable an existing theft deterrent system associated with the particular vehicle when the engine is shutdown. In this case, the present secure idle mode of operation will be disabled at step 130 when ECM 40 enables the other theft deterrent system at step 128. Normal procedures for disabling the existing theft deterrent system of step 128 will be in accordance with the applicable procedures for disabling that particular theft deterrent system. Upon execution of step 130, control loop 82 will again return to its calling routine at step 132. This embodiment therefore couples the present secure idle mode of operation to an existing engine shutdown theft deterrent system already associated with a particular vehicle.

Still further, FIG. 4 represents still another embodiment of control loop 82 wherein operating steps 100, 102, 104 and 106 illustrated in FIG. 3B are replaced by operating steps 134, 136, 138, 140 and 142. In this particular software arrangement, instead of ECM 40 outputting a signal to the fuel delivery system 51 to limit the engine speed to low idle or some other predetermined idle speed at step 100 (FIG. 3B), ECM 40 can be programmed to output a signal to automatically shutdown the engine at step 134 (FIG. 4). Upon execution of step 134, control loop 82 will then advance to step 136 wherein the secure idle mode of operation will prohibit engine restart as previously explained with respect to step 112 (FIG. 3C) until a valid security code is again entered and accepted by ECM 40. Step 136 is identical to step 112 illustrated in FIG. 3C and, in fact, operating steps 138, 140 and 142 function and operate in a substantially identical manner as steps 114, 116 and 118 illustrated in FIG. 3C.

In a similar manner, it is also recognized and anticipated that steps 136, 138, 140 and 142 can likewise be replaced with operating steps 128, 130 and 132 illustrated in FIG. 3D such that another theft deterrent system associated with the particular vehicle can be automatically enabled upon shutdown of the vehicle engine at step 134.

Referring again to FIGS. 3A and 3B and, in particular, operating steps 92, 96 and 98, it is important to recognize that the present theft deterrent system 10 will enable an operator to run certain parasitic devices without triggering the theft deterrent features associated with steps 92, 96 and 98. This is accomplished through use of the cruise control switches 24 wherein both the idle bump up RPM as well as the engine acceleration ramp up rate associated with use of the cruise control switches 24 are set via ECM 40 such that the predetermined fuel flow value established at step 92 (FIG. 3A) and the predetermined engine speed error value established at step 96 (FIG. 3A) are not exceeded. As previously explained, the predetermined fuel flow limit established in step 92 will accommodate the running of certain parasitic loads but such limit will not accommodate the higher fuel flow rates necessary to accomplish vehicle movement or other work type tasks. Similarly, the predetermined engine speed error value established at step 96 should be selected so as to allow the cruise control switches 24 to slowly accelerate and bump up the idle RPM without triggering step 100 (FIG. 3B) whereas, on the other hand, an operator requested desired engine speed necessary to perform a work task, or to move the vehicle from an idle state, will be greater than the predetermined values established at steps 92, 96 and 98 and will trigger step 100. Still further, movement of the throttle in a range below 10% as established at step 98 (FIG. 3B) will likewise afford an operator the opportunity to elevate the engine RPM to run certain parasitic loads without again triggering step 100. This enhanced capability therefore allows an operator to operate the vehicle engine in a secure mode of operation and still elevate the engine RPM to run certain parasitic loads without triggering the theft deterrent features explained above.

The present theft deterrent system 10 therefore monitors and evaluates a plurality of operational state parameters including engine load parameters in order to ensure both that the vehicle is substantially motionless and that no work task is being performed prior to any enablement of such system. The present system 10 also ensures that, when the system is enabled, elevated engine speed operation is achievable to run certain parasitic loads without triggering restricted engine operation, or without shutting down the engine. Under certain circumstances, the present system 10 may also be programmed to automatically shutdown the vehicle engine and enable other theft deterrent systems associated with the particular vehicle. Based upon the monitoring of the plurality of vehicle/engine operational state parameters sensed by the present system 10, ECM 40 will output appropriate signals to the engine speed governor 44, or to other appropriate vehicle/engine components, to prevent unauthorized use of the vehicle while it is in an unattended idle mode of operation.

Industrial Applicability

As described herein, the present theft deterrent system 10 has particular utility and can be incorporated into any vehicle or work machine wherein a secure idle mode of operation is desired.

With respect to the programming or logic configuration explained above with respect to control loops 52 (FIG. 2) and 82 (FIGS. 3A, 3B, 3C, 3D and 4), ECM 40 can be programmed to monitor the signal inputs identified in FIG. 1 regardless of the types of sensors and switches utilized, and regardless of the configuration of the engine speed governor 44; the present system 10 can be utilized both separate from and in conjunction with any other theft deterrent system associated with any particular vehicle; and any combination of the vehicle/engine monitoring events or parameters set forth and established in control loops 52 and 82 can be utilized for selectively altering or limiting normal vehicle operation so long as parameters indicative of both vehicle movement and work being performed are sensed and monitored by ECM 40.

It is also recognized that variations to the operating steps depicted in flow charts 52 and 82 could likewise be made without departing from the spirit and scope of the present invention. In particular, steps could be added or some steps could be eliminated. All such variations are intended to be covered by the present invention. Still further, the security code input device 36 could take on a wide variety of different configurations such as a code interface module having a microprocessor or microcontroller associated therewith, or such code interface module may utilize the processing means associated with ECM 40.

Still further, it is also recognized and anticipated that other known devices and/or subsystems may be utilized in conjunction with the present invention to enter the required security code information. For example, security code input device 36 may include a proximity or other card reader operable to read information provided on a magnetic strip associated with the access card, a memory disc reading device, voice recognition systems or other known information transfer devices/systems. The present invention also contemplates that the present security code input device 36 may include some type of data link or other data transceiver operable to receive a security code from a remote location.

As is evident from the foregoing description, certain aspects of the present invention are not limited to the particular details of the examples illustrated herein, and it is therefore contemplated that other modifications and applications will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

I claim:

1. A vehicle theft deterrent system for controlling the operation of a vehicle engine when such engine is in an idle mode of operation, said theft deterrent system comprising:

a vehicle speed sensor for determining the ground speed of the vehicle;

an engine speed sensor for determining the speed of the engine;

an operator input device actuatable to enter a security code;

a PTO switch operable to permit power from the engine to be provided to a remote location, said PTO switch being operable between a first mode of operation corresponding to a condition when power is not being transferred to said remote location and a second mode of operation corresponding to a condition when power is being transferred to said remote location;

an electronic controller coupled to said speed sensors, said operator input device, said PTO switch, and receiving signals therefrom, said controller being operable to receive a signal from said vehicle speed sensor indicative of the ground speed of the vehicle, a signal from said engine speed sensor indicative of the engine speed, a signal from said operator input device indicative of the entry of a valid security code, a signal from said PTO switch indicative of said switch being in either its first mode of operation or its second mode of operation, said controller calculating an engine speed error and a fuel flow command; and said controller enabling the theft deterrent system when said controller receives a signal indicative of the vehicle ground speed being less than a predetermined ground speed signal indicative of the engine speed being less than a first predetermined value, a signal indicative of the first entry of a valid security code, a signal indicative of said PTO switch being in its first mode of operation, said fuel flow command being less than a predetermined value, and said engine speed error being less than a predetermined value.

2. The theft deterrent system, as set forth in claim 1, wherein the vehicle engine has a low idle RPM associated with a low idle mode of operation, said first predetermined engine speed value being substantially equal to the low idle RPM plus 100 RPM.

3. The theft deterrent system, as set forth in claim 1, wherein said vehicle engine is capable of running certain parasitic loads, said predetermined fuel flow value being less than the fuel flow required to run said certain parasitic loads.

4. The theft deterrent system, as set forth in claim 1, wherein said predetermined engine speed error is substantially equal to 100 RPM.

5. The theft deterrent system, as set forth in claim 1, wherein said controller disables the theft deterrent system when said controller receives a subsequent signal indicative of a second entry of a valid security code.

6. The theft deterrent system, as set forth in claim 1, further including an idle shutdown timer operable to send a signal upon expiration thereof, said timer being programmable to any predetermined period of time and being initiated when said theft deterrent system is enabled, said controller being operable to receive a signal from said idle shutdown timer indicative of the expiration thereof, said controller outputting a signal to shutdown the vehicle engine when said controller receives a signal indicative of the expiration of said idle shutdown timer.

7. The theft deterrent system, as set forth in claim 6, wherein said controller is further operable to prohibit restart of the vehicle engine until said controller receives a subsequent signal indicative of a second entry of a valid security code.

8. The theft deterrent system, as set forth in claim 6, further including another theft deterrent system operable when the vehicle engine is not running, said controller being operable to automatically enable said another theft deterrent system when said vehicle engine is shutdown.

9. The theft deterrent system, as set forth in claim 1, further including an ignition key switch operable between a first mode of operation to allow the vehicle engine to be started, a second mode of operation to allow the vehicle engine to run, and a third mode of operation to allow the vehicle engine to be shutdown in a normal manner, said controller being coupled to said ignition key switch for receiving signals therefrom, said controller outputting a signal to shutdown the vehicle engine when said controller receives a signal indicative of said ignition key switch being in its third mode of operation.

10. The theft deterrent system, as set forth in claim 9, wherein said controller is further operable to prohibit restart of the vehicle engine until said controller receives a subsequent signal indicative of a second entry of a valid security code.

11. The theft deterrent system, as set forth in claim 1, wherein said controller is further operable to output a signal to limit the speed of the engine to a predetermined idle speed when said controller receives a signal from said vehicle speed sensor indicative of the ground speed of said vehicle being greater than a predetermined amount.

12. The theft deterrent system, as set forth in claim 1, wherein said controller is further operable to output a signal to limit the speed of the engine to a predetermined idle speed when said controller receives a signal from said engine speed sensor indicative of the engine speed being less than a second predetermined value.

13. The theft deterrent system, as set forth in claim 1, wherein said controller is further operable to output a signal to limit the speed of the engine to a predetermined idle speed when said controller receives a signal indicative of said PTO switch being in its second mode of operation.

14. The theft deterrent system, as set forth in claim 1, wherein said controller is further operable to output a signal to limit the speed of the engine to a predetermined idle speed when said fuel flow command is greater than said predetermined value.

15. The theft deterrent system, as set forth in claim 1, wherein said controller is further operable to output a signal to limit the speed of the engine to a predetermined idle speed when said engine speed error is greater than said predetermined value.

16. The theft deterrent system, as set forth in claim 1, further including throttle position indicator means for determining the throttle setting of the vehicle engine,
    said controller being coupled to said throttle position indicator means for receiving signals therefrom, said controller outputting a signal to limit the speed of the engine to a predetermined idle speed when said controller receives a signal indicative of said throttle setting being greater than a predetermined setting for a predetermined period of time.

17. The theft deterrent system, as set forth in claim 11, wherein said predetermined ground speed value is approximately 1 mile per hour.

18. The theft deterrent system, as set forth in claim 12, wherein said second predetermined engine speed value is low idle RPM minus 100 RPM.

19. The theft deterrent system, as set forth in claim 16, wherein said predetermined throttle setting is approximately 10 percent.

20. The theft deterrent system, as set forth in claim 1, wherein said controller is further operable to output a signal to shutdown the vehicle engine when said controller receives a signal from said vehicle speed sensor indicative of the ground speed of said vehicle being greater than a predetermined amount.

21. The theft deterrent system, as set forth in claim 1, wherein said controller is further operable to output a signal to shutdown the vehicle engine when said controller receives a signal from said engine speed sensor indicative of the engine speed being less than a second predetermined value.

22. The theft deterrent system, as set forth in claim 1, wherein said controller is further operable to output a signal to shutdown the vehicle engine when said controller receives a signal indicative of said PTO switch being in its second mode of operation.

23. The theft deterrent system, as set forth in claim 1, wherein said controller is further operable to output a signal to shutdown the engine when said fuel flow command is being greater than said predetermined value.

24. The theft deterrent system, as set forth in claim 1, wherein said controller is further operable to output a signal to shutdown the vehicle engine when said engine speed error is greater than said predetermined value.

25. The theft deterrent system, as set forth in claim 1, further including throttle position indicator means for determining the throttle setting of the vehicle engine,
    said controller being coupled to said throttle position indicator means for receiving signals therefrom, said controller outputting a signal to shutdown the vehicle engine when said controller receives a signal indicative of said throttle setting being greater than a predetermined setting for a predetermined period of time.

26. The theft deterrent system, as set forth in claim 1, further including cruise control switches actuatable to control the speed of the vehicle engine and to the bump up the idle RPM,
    said controller being coupled to said cruise control switches for receiving signals therefrom, said cruise control switches being further operable such that the idle bump up RPM triggered when said switches are actuated will not exceed the predetermined governor speed error value.

27. The theft deterrent system, as set forth in claim 1, further including cruise control switches actuatable to control the speed of the vehicle engine and to accelerate the vehicle engine at a predetermined ramp up rate,
    said controller being coupled to said cruise control switches for receiving signals therefrom, said cruise control switches being further operable such that the engine acceleration ramp up rate commanded by actuation of said switches will produce a fuel flow which will not exceed the predetermined fuel flow value.

* * * * *